Sept. 24, 1963 E. C. GOSSETT 3,104,556
WEAR ADJUSTMENT APPARATUS AND METHOD FOR SPROCKET DRIVES
Filed Aug. 23, 1962 3 Sheets-Sheet 1
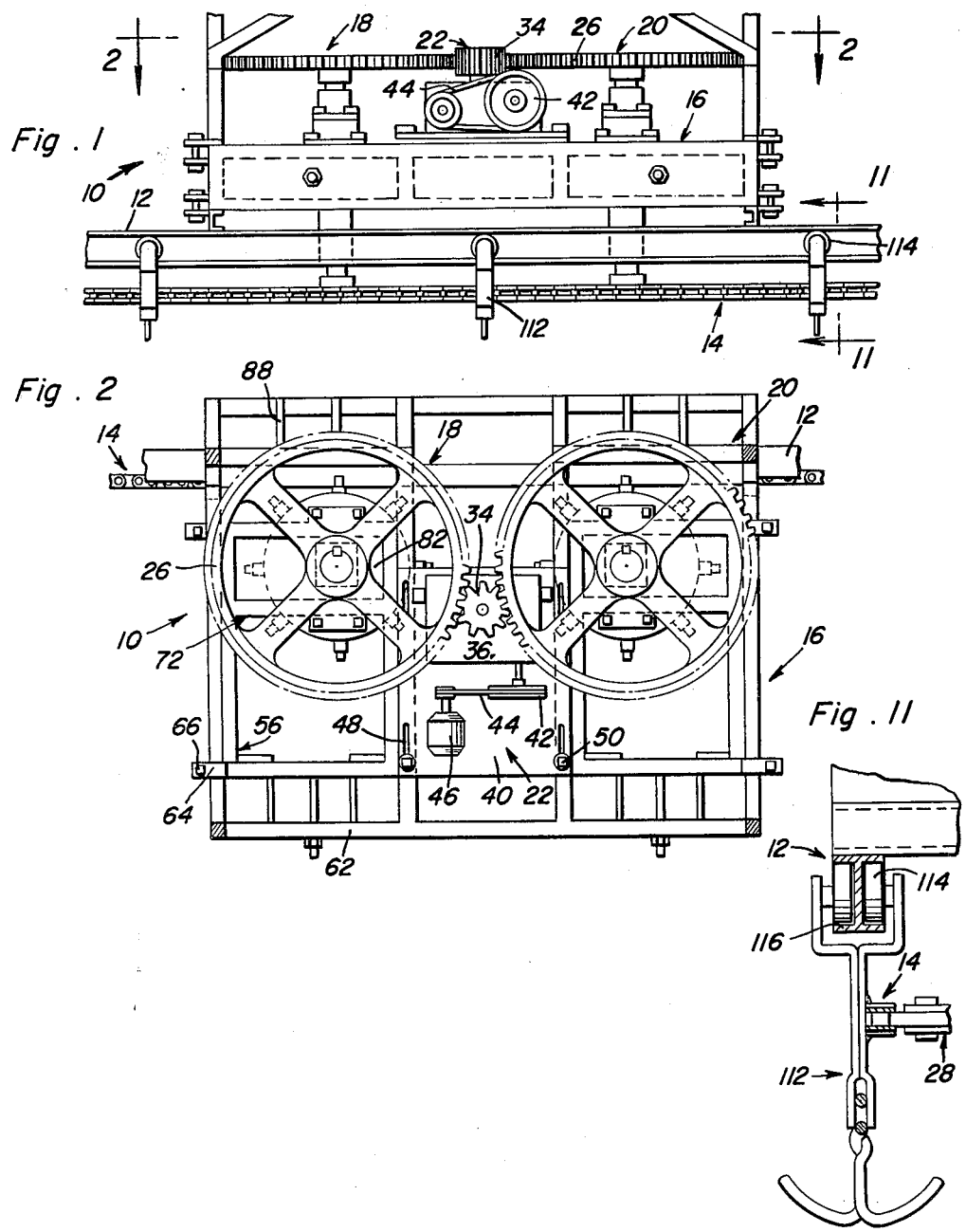
Earle C. Gossett INVENTOR.

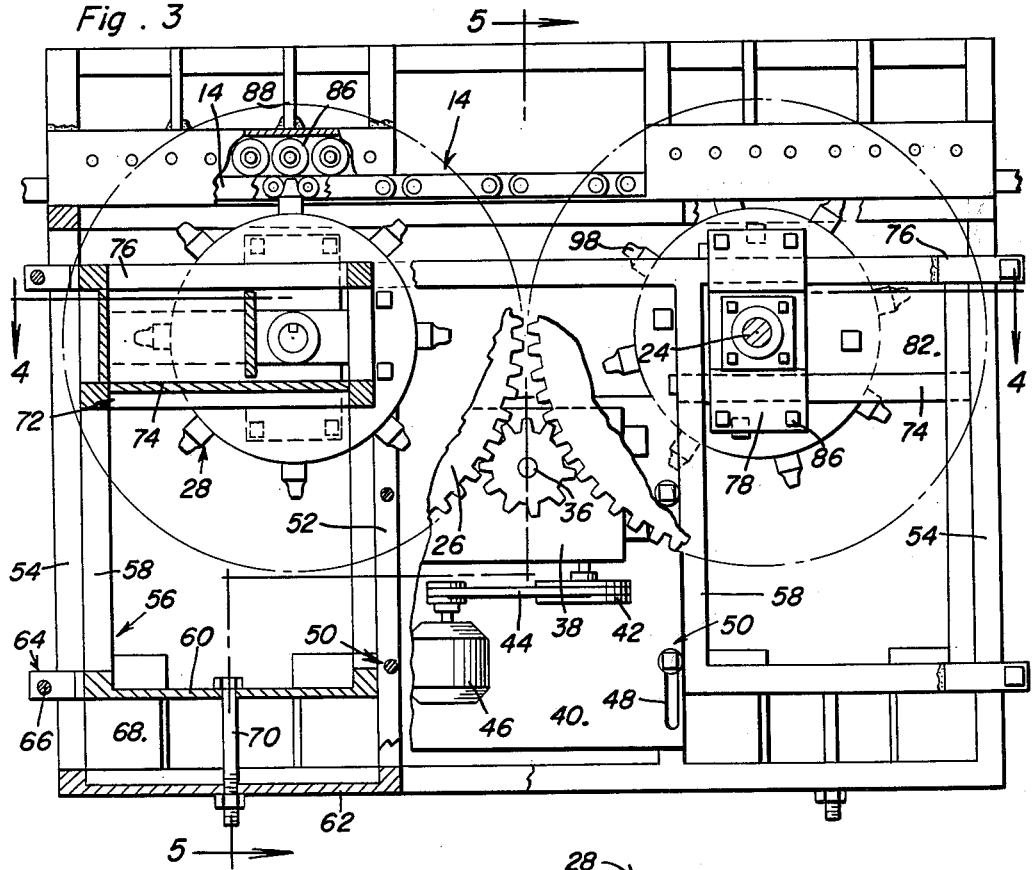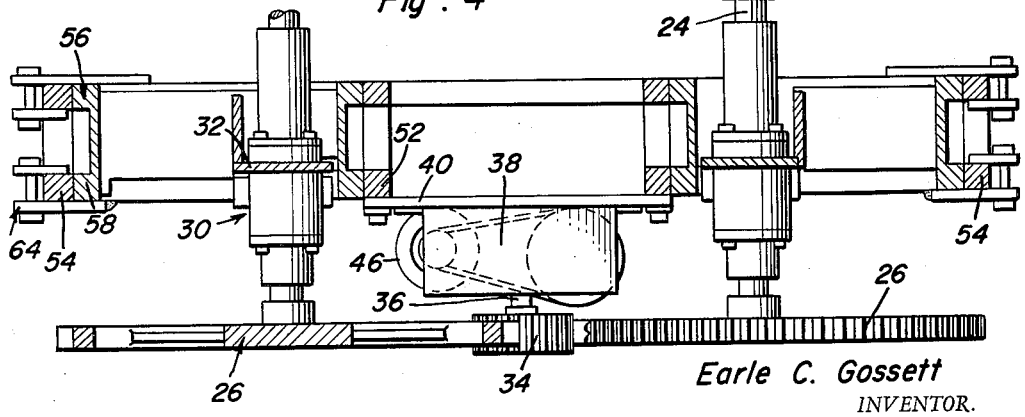

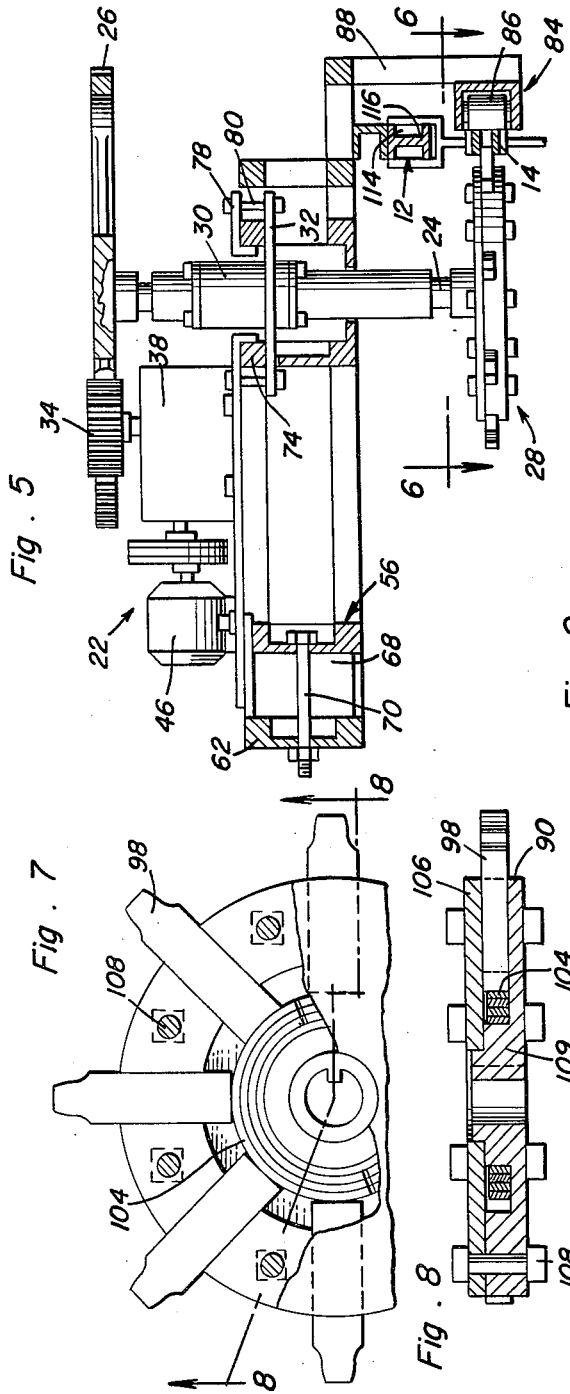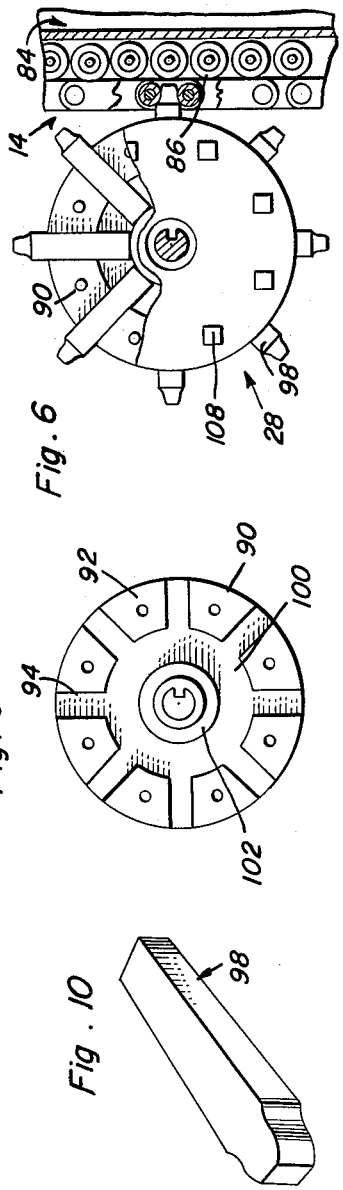
Earle C. Gossett
INVENTOR.

United States Patent Office 3,104,556
Patented Sept. 24, 1963

3,104,556
WEAR ADJUSTMENT APPARATUS AND METHOD FOR SPROCKET DRIVES
Earle C. Gossett, 1270 Alexandrine, Mount Morris, Mich.
Filed Aug. 23, 1962, Ser. No. 218,937
5 Claims. (Cl. 74—397)

This invention relates to a sprocket drive assembly particularly suited for conveyor chains and more particularly, to a sprocket drive assembly, the life of which is prolonged without replacement of parts by a wear compensating adjustment procedure made possible by a novel construction and arrangement of parts.

It is therefore a primary object of the present invention, to provide an adjustable sprocket drive assembly for sprocket chains, conveyors and monorail drive devices, having a useful life which is significantly prolonged beyond that of comparable drive assemblies heretofore utilized.

Another object of the present invention is to provide a drive sprocket adjustment method whereby adjustment is facilitated in connection with wear take-up.

A still further object of the present invention in accordance with the foregoing objects, is to provide a sprocket drive assembly in which effective driving relationships between the moving parts may be maintained without replacement of any parts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the sprocket drive arrangement of the present invention in one typical installation.

FIGURE 2 is a top sectional view of the drive sprocket assembly taken through a plane indicated by section line 2—2 in FIGURE 1.

FIGURE 3 is an enlarged top sectional view of the sprocket drive assembly with parts broken away and shown in section, the assembly also being disposed in a different adjusted position from that illustrated in FIGURE 2.

FIGURE 4 is a sectional view taken substantially through a plane indicated by section line 4—4 in FIGURE 3.

FIGURE 5 is a sectional view taken substantially through a plane indicated by section line 5—5 in FIGURE 3.

FIGURE 6 is a partial sectional view taken substantially through a plane indicated by section line 6—6 in FIGURE 5.

FIGURE 7 is a partial front elevational view of a sprocket wheel assembly with parts broken away.

FIGURE 8 is a sectional view taken substantially through a plane indicated by section line 8—8 in FIGURE 7.

FIGURE 9 is a front elevational view of a disassembled part of the sprocket wheel assembly illustrated in FIGURES 7 and 8.

FIGURE 10 is a perspective view of a sprocket tooth utilized in the sprocket wheel assembly.

FIGURE 11 is a sectional view taken substantially through a plane indicated by section line 11—11 in FIGURE 1.

Referring now to the drawings in detail, a sprocket drive assembly generally referred to by reference numeral 10 is shown in FIGURES 1, 2 and 11 associated with a monorail support 12 below which a conveyor sprocket chain 14 extends. The sprocket drive assembly 10 therefore includes a frame assembly generally referred to by reference numeral 16 which mounts all of the movable and adjustable parts of the drive assembly in proper operative relationship to each other and to the sprocket chain 14 driven by the drive assembly. Accordingly, the frame assembly 16 may be mounted in any suitable manner by being suspended above the monorail support 12 so that a pair of chain driving sprocket wheel assemblies 18 and 20 may extend in a vertical direction above and below the monorail support 12 for meshing engagement with an input drive assembly generally referred to by reference numeral 22 and with the sprocket chain 14 disposed below the monorail support in a horizontal plane.

Referring now to FIGURES 3, 4, and 5 in particular, it will be observed that each of the sprocket wheel assemblies 18 and 20 includes a sprocket shaft 24 one axial end of which has a driven gear member 26 connected thereto while the other axial end has a sprocket gear wheel assembly 28 connected thereto. The sprocket shaft 24 is rotatably mounted by a bearing assembly 30 which is fixed to a journal bracket 32. The journal bracket 32 is adjustably positioned on the frame assembly 16 as will be hereafter described in greater detail. The driven gear members 26 both mesh with a drive gear pinion 34 fixed to a drive shaft 36 which extends parallel to the sprocket shafts 24 and projects out of the reduction gear box 38 which is fixedly mounted on an adjustable mounting bracket 40 of the input drive assembly 22. The reduction gear box 38 is therefore also provided with an input drive wheel 42 which is belt connected by the belt drive 44 to an electric motor or other suitable prime mover 46 also fixedly mounted on the mounting bracket 40. The mounting bracket is therefore provided with a plurality of adjustment slots 48 through which bolt assemblies 50 fixed to the frame assembly 16, extend for the purpose of locking the mounting bracket 40 in any adjustable position. In this manner, the input drive assembly 22 may be adjustably moved in a direction perpendicular to the sprocket chain 14 so as to properly space the drive gear member 34 thereof in meshing engagement with the driven gear members 26 of the sprocket assemblies 18 and 20. It will also be observed, that the mounting bracket 40 is slidably mounted between a pair of parallel post members 52 of the frame assembly 16 to which the bolt members 50 are connected.

The frame assembly 16 also includes pairs of outer post frame members 54 disposed parallel to the frame members 52 so as to form therebetween a sliding trackway for a radial adjustment frame assembly generally referred to by reference numeral 56. The radial adjustment frame assembly 56 includes a pair of parallel side members 58 interconnected at ends thereof remote from the monorail support by a connecting portion 60 which is adjustably spaced from the fixed end portion 62 of the frame assembly 16. Accordingly, connected to the outer side frame members 58, are pairs of clamp assemblies 64 by means of which the vertical adjustment frame assembly 56 is locked in adjusted position on the frame assembly 16 by means of the bolt assemblies 66. Accurate spacing of the adjustment assembly 56 is however obtained by means of a plurality of shims 68 which are disposed between the connecting portion 60 of the adjustment assembly 56 and the lower frame portion 62 of the frame assembly. A tightening bolt assembly 70 is therefore provided and interconnects the frame portion 62 with the connection portion 60 of the adjustment assembly 56. In this manner, radial adjustment of the sprocket assemblies 18 and 20 carried by the adjustment assembly 56, is achieved.

Adjustably carried on the adjustment assembly 56, is a pitch adjustment assembly generally referred to by reference numeral 72 which includes a slide frame member 74 connected between the side frame members 58 of the adjustment assembly 56 and spaced in parallel relation to the connecting member 76 of the adjustment assembly 56. The journal bracket 32 to which the bearing assembly 30 for the sprocket assemblies is connected, is thereby slidably adjusted in a direction parallel to the sprocket chain 14 or monorail support member 12. The journal bracket 32 may therefore be clamped in adjusted position by means of the clamp elements 78 and the bolt assemblies 80. However, in order to accurately position the journal plate member 32 within the track formed between the members 74 and 76, a plurality of spacing shims 82 may be disposed on one side of the journal bracket as shown in FIGURE 3 or on both sides thereof as shown in FIGURE 2. In this manner, the sprocket wheel assemblies 28 carried by the sprocket shaft 24, may be adjusted in a direction parallel to the sprocket chain so as to accommodate the change in tooth pitch effected by radial adjustment of the adjustment assembly 56.

It will be observed from FIGURES 3, 5 and 6, that each of the sprocket wheel assemblies 28 meshes with the sprocket chain 14, at which locations the sprocket chain 14 is backed up by a plurality of bearing rollers 86 rotatably mounted on assemblies 84 that may be connected to the frame assembly 16 by means of a plurality of ribs 88 disposed on one side of the frame assembly as viewed in FIGURES 2, 3, and 5. The sprocket wheels 28 connected to the sprocket shafts 24 will therefore be held in proper meshing relationship to the sprocket chain 14 aligned with the backup rollers 86. Each of the sprocket wheels 28 as more clearly seen in FIGURES 6, 7, 8, 9 and 10, includes a circular mounting plate member 90 provided with a plurality of segmental projections 92 defining therebetween radial slots 94 within which a plurality of sprocket teeth 98 are slidably received. An annular space 100 is also formed between the hub portion 102 of the circular plate member 90 and the radial inner surfaces of the segmental projections 92. By placing a plurality of arcuate spacing shims 104 on the hub portion 102, the radial positions of the sprocket teeth 98 may be determined. After so assembling the sprocket teeth 98 within the slots 94 in radial spaced relation to the hub portion 102, the assembly may be locked in such condition by means of the annular plate 106 which is secured to the mounting plate 90 by means of a plurality of bolt assemblies 108 which are connected to the mounting plate 90.

The procedure for adjusting the drive sprocket assembly in order to compensate for wear thereof, may now be reviewed by comparing FIGURES 3 and 2. The drive sprocket assembly may initially be in the condition illustrated in FIGURE 3 and after operation for a prolonged period of time in such condition, the sprocket teeth 98 or the engaged elements of the sprocket chain 14 may have become so worn as to render the drive relationship therebetween ineffective or inefficient. Rather than replace the chain or the sprocket wheel assemblies 28, radial adjustment of the sprocket teeth may correct the situation. Accordingly, the radial adjustment assemblies 56 may be loosened by loosening of the bolt assemblies 66 at the clamps 64, whereupon the requisite number of spacing shims 68 may be removed from one end of the adjustment assemblies 56. The pitch adjustment assemblies 72 are also loosened by means of the bolts 80 so that adjustment shims 82 may be removed from one side of the journal assemblies 30 and placed on the other side thereof as shown in FIGURE 2. The transfer of adjustment shims 82 for laterally repositioning the sprocket assemblies 18 and 20 will depend upon the amount of radial adjustment effected and the corresponding increase in circular pitch of the sprocket wheels 28. The bolts 70 previously loosened by removal of spacing shims 68, may then be tightened so as to draw the radial adjustment assemblies and the sprocket assemblies carried thereby, away from the sprocket chain and the adjustment assemblies 56 thereafter locked in adjusted position by tightening of the clamp bolts 66. The sprocket teeth 98 on the sprocket wheels 28 are then loosened by means of the bolts 108 so that additional spacing shims 104 may be inserted in order to radially extend the sprocket teeth 98 into proper meshing engagement with the sprocket chain 14. The readjusted sprocket wheels are then locked by means of the bolts 108 and the plate 106. Thereafter, the pitch adjustment assemblies 72 may be locked by means of the bolts 80 and clamp elements 78 in proper adjusted position in accordance with the change in tooth pitch hereinbefore referred to. It will then be appreciated, that the drive gear member 34 will require relocation in order to mesh with the gear members 26 of the sprocket assemblies since any change in spacing between the rotational axes of the driven gears 26 after effecting the aforementioned pitch adjustment, will also change the distance between the rotational axes of the driven gears and the drive gear 34. Accordingly, the mounting bracket 40 will be loosened by means of the locking bolts 50 and shifted so as to bring the drive pinion member 34 into mesh with the driven gear members 26 which may be varied in spacing as seen when comparing FIGURES 2 and 3. The bolt members 50 are then tightened to lock the input drive assembly 22 in its relocated position as shown for example in FIGURE 2. The drive sprocket assembly will then be effective once again to drive the sprocket chain 14.

It will be appreciated, that the sprocket drive assembly may be installed in different locations and may also be associated with the drive of sprocket chains for different purposes. For example, the sprocket chain 14 as illustrated, is associated with load carrying hook assemblies 112 having supporting rollers 114 at the upper ends thereof riding within tracks 116 formed in the I-beam support 12. Also the sprocket drive assembly of the present invention may be associated with a fixed rack or sprocket chain for the purpose of propelling the sprocket drive unit and any load carried thereon. It should therefore be apparent, that the utility of the wear compensating sprocket drive assembly is not necessarily restricted to the particular installation desscribed. It will also be appreciated, that by virtue of the described arrangement of parts and adjustment features, a relatively simple and accurate wear compensating adjustment is made possible and as a result of which the life of the sprocket drive assembly and driven sprocket chain may be prolonged and maintained in an efficiently operating condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wear compensating sprocket drive assembly for a sprocket chain comprising, frame means mounted in operative relation to said sprocket chain, sprocket wheel means adjustably mounted on said frame means, drive gear means adjustably mounted on said frame means, sprocket bearing means rotatably mounting said sprocket wheel means for driving engagement with said sprocket chain and drive gear means, said sprocket wheel means including radially projecting sprocket teeth, means for locking said teeth at radially adjustable positions and driven gear means for meshing with said drive gear means, and adjustable mounting means slidably mounting said sprocket bearing means on the frame means to variably space the sprocket wheel means relative to the sprocket chain to obtain driving engagement therewith for all radially adjustable positions of the sprocket teeth.

2. The combination of claim 1, wherein said adjustable mounting means includes, radial adjustment means slidably mounted on the frame means for movement in a direction perpendicular to said sprocket chain, reducible spacing means mounted on the frame means abutting one end of said radial adjustment means remote from the sprocket chain, pitch adjustment means mounted on the radial adjustment means to slidably mount the sprocket bearing means for movement in a direction parallel to the sprocket chain, and adjustable spacing means mounted on the pitch adjustment in abutting relation on opposite sides of the sprocket bearing means.

3. The combination of claim 2 wherein said drive gear means comprises, a mounting bracket slidably mounted on the frame means for movement parallel to said radial adjustment means, motor means fixedly mounted on the mounting bracket, reduction gear means fixedly mounted on the mounting bracket for driving connection to the motor means and having a drive gear meshing with said driven gear means of the sprocket wheel means in all adjustable positions thereof.

4. The combination of claim 3, wherein said driven gear means comprises a pair of gear members axially spaced from the sprocket teeth.

5. The combination of claim 1 wherein said drive gear means comprises, a mounting bracket slidably mounted on the frame means for movement perpendicular to said sprocket chain, motor means fixedly mounted on the mounting bracket, reduction gear means fixedly mounted on the mounting bracket for driving connection to the motor means and having a drive gear meshing with said driven gear means of the sprocket wheel means in all adjustable positions thereof.

References Cited in the file of this patent

UNITED STATES PATENTS

| | | |
|---|---|---|
| 259,875 | Lechner | June 20, 1882 |
| 504,937 | Parsons | Sept. 12, 1893 |
| 1,315,377 | McGiehan | Sept. 9, 1919 |
| 1,936,117 | Peschl | Nov. 21, 1933 |
| 2,144,964 | De Falco | Jan. 24, 1939 |